June 29, 1943.     F. E. LANGE     2,322,942

TRANSFORMER MOTOR

Filed April 19, 1940

Inventor
Frederick E. Lange

By *George H. Fisher*
                Attorney

Patented June 29, 1943

2,322,942

UNITED STATES PATENT OFFICE 2,322,942

TRANSFORMER MOTOR

Frederick E. Lange, Minneapolis, Minn., assignor to Minneapolis-Honeywell Regulator Company, Minneapolis, Minn., a corporation of Delaware Application April 19, 1940, Serial No. 330,543

8 Claims. (Cl. 172—278)

The present invention is concerned with a transformer motor and more particularly with one of the reversible type.

It has previously been proposed to combine the functions of a transformer and motor in a single unit, the secondary circuit of the transformer acting as the control circuit for the motor. The usual motor of this type is however inherently unidirectional.

An object of the present invention is to provide a transformer motor which can be reversed and which can be controlled through a two wire low voltage circuit.

A further object of the present invention is to provide a transformer motor wherein the majority of the field flux is selectively forced through one or the other of two oppositely shaded sets of poles.

A further object of the invention is to provide a transformer motor wherein there are two oppositely shaded sets of poles providing flux paths of different reluctance and wherein means are provided for decreasing the proportion of the total flux that flows in the low reluctance flux path to reverse the direction of rotation of the motor.

A further object of the invention is to provide a transformer motor of the type set forth in the preceding object in which the means for decreasing the proportion of the total flux that flows in the low reluctance flux path comprises a low voltage secondary winding and a low voltage control switch.

Figure 1:
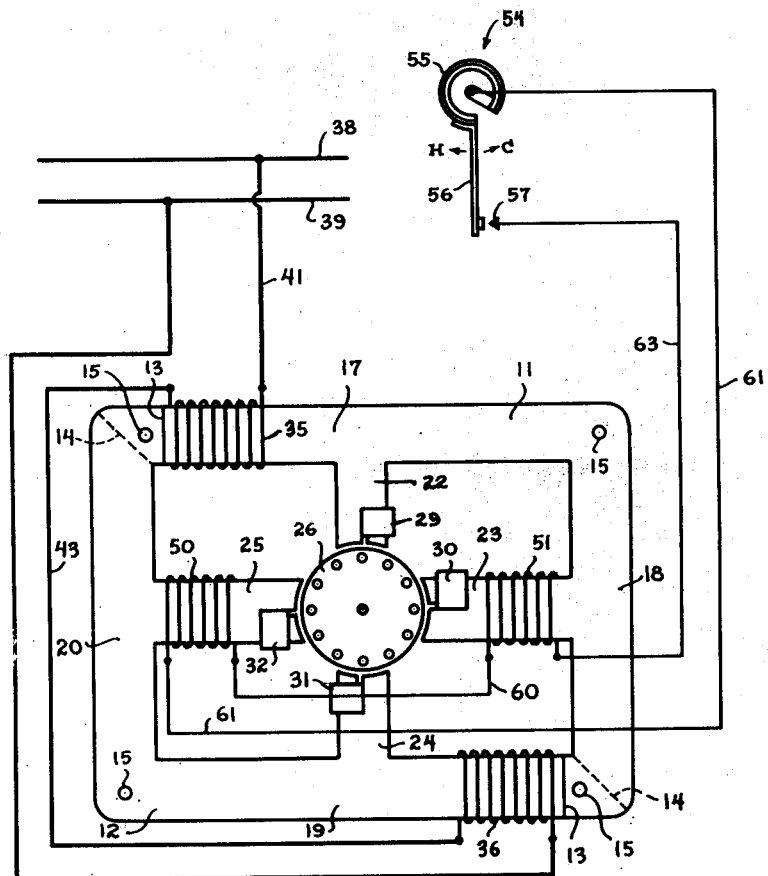
Figure 2:
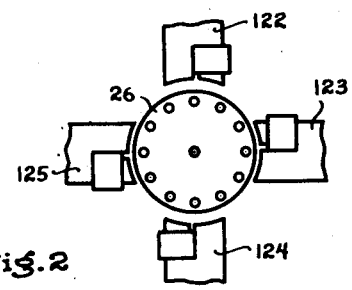

Other objects of the invention will be apparent from a consideration of the accompanying specification, claims, and drawing, of which Figure 1 is a schematic showing of one form of the invention, and Figure 2 illustrates a portion of a modified form of the invention.

Referring to the drawing, the core construction comprises two generally L-shaped portions 11 and 12 which are joined to form a rectangular frame. The portions 11 and 12 are formed of laminated magnetic material in the customary manner and at the diagonally oppositely disposed joints, the laminations of the respective sections are overlapped to form a joint of lower reluctance. This is indicated in the drawing by the solid and dotted lines 13 and 14, respectively. If desired, alternate laminations may be of the length indicated by the solid line and the dotted line respectively. The laminations of the sections and the two sections themselves are held together by rivets 15 or other suitable fastening means. The rectangular frame formed by the two portions 11 and 12 includes four core legs 17, 18, 19, and 20. Projecting inwardly from these legs are pole portions 22, 23, 24, and 25, respectively. These pole portions are curved at their inner ends to define a circular opening in which is rotatably mounted a squirrel cage armature 26. The inner end of each of the pole portions 22 to 25 is slotted and provided with a shading ring over a portion thereof. The shading rings are designated by the reference numerals 29, 30, 31, and 32. It will be noted that shading rings 29 and 31 are disposed on the clockwise side of their respective poles while shading rings 30 and 32 are disposed on the counter-clockwise side. Since in a shaded pole induction motor, the rotor tends to rotate in the direction of the shaded portion of the poles, it will be obvious that the flux flowing through poles 22 and 24 will tend to rotate armature 26 in a clockwise direction while the flux flowing through poles 23 and 25 will tend to rotate the armature in a counterclockwise direction. The pole portions 22 and 24 are of considerably smaller cross section than the pole portions 23 and 25 so that the pole portions 22 and 24 have a considerably higher reluctance than pole portions 23 and 25.

Disposed on the left hand portion of core leg 17 is a field winding 35. Disposed on the right hand portion of the core leg 19 is a similar field winding 36. The two field windings 35 and 36 are energized from line wires 38 and 39 leading to any suitable source of power (not shown). The two windings are shown as connected in series in the following circuit, from line wire 38 through conductor 41, field winding 35, conductor 43, field winding 36, and conductor 44 to the other line wire 39. The two field windings 35 and 36 can be connected in parallel if so desired.

Secondary windings 50 and 51 are disposed upon the pole portions 25 and 23, respectively. These windings are connected together in series with a control switch 54. The control switch 54 is shown in the form of a room thermostat comprising a bimetallic element 55 to which is secured a contact arm 56 adapted to engage a fixed contact 57. Upon a temperature fall, the bimetallic element 55 moves a contact arm 56 to the right into engagement with contact 57. While the control switch has been shown as a room thermostat and while the invention is particularly adaptable in connection with a sensitive control switch such as a room thermostat, it is to be understood that the invention is not so limited.

Operation

As pointed out above, the two field windings 35 and 36 are constantly energized by reason of their connection to the line wires 38 and 39.

The pole portions 22 to 25 provide with the core frame two flux paths through the armature 26. Thus the flux produced by winding 35 will flow through the upper portion of leg 20, pole portion 25, the armature 26, pole portion 23, the upper portion of leg 18 and leg 17. The flux produced by this winding 35 may also flow through leg 20, the left hand portion of leg 19, pole portion 24, armature 26, pole portion 22, and the left hand portion of core leg 17. Similarly the flux produced by winding 36 may flow through the right hand portion of core 19, pole portion 24, armature 26, pole portion 22, the right hand portion of core leg 17, and core leg 18. On the other hand, the flux produced by winding 36 may flow through leg 19, the lower portion of leg 20, pole portion 25, armature 26, pole portion 23, and the lower portion of core leg 18.

It will be seen from the above that the flux produced by each of the field windings 35 and 36 may flow through either one of two paths one of which paths includes the pole portions 23 and 25 and the other of which paths includes the portions 22 and 24. The pole portions 22 and 24, as previously pointed out, are of smaller dimension so as to have a greater reluctance than pole portions 23 and 25. The result is that when the elements are in the position shown, the greater portion of the flux produced by both windings 35 and 36 flows through pole portions 23 and 25. Since the shading windings 30 and 32 on these pole portions are disposed so as to produce counter-clockwise rotation of armature 26, the armature 26 will rotate in a counter-clockwise direction when the elements are in the position shown in the drawing.

Whenever the temperature to which bimetallic element 55 is subjected drops sufficiently to cause contact blades 56 to engage contact 57 the following circuit is established to coils 50 and 51: from coil 51 through conductor 60, coil 50, conductor 61, bimetallic element 55, contact arm 56, contact 57 and conductor 63 back to coil 51. The result of the establishment of this circuit is that coils 50 and 51 are substantially short-circuited. In other words, the impedance in series with coils 50 and 51 is reduced from an extremely high value to nearly zero. The short-circuiting of these coils results in a flow of current therethrough, with the resultant production of a counter-magnetomotive force in the flux path including pole portions 23 and 25. As a result, much of the flux which flowed through these pole portions is now forced through the pole portions 22 and 24. The shading rings 29 and 31 on the latter pole portions are disposed clockwise so that the flux flowing through these pole portions tends to cause the motor to operate in a clockwise direction. The motor will thus rotate in a clockwise direction as long as contact arm 56 is in engagement with contact 57.

It is seen from the above that the motor will always rotate in one direction or the other depending upon whether the thermostat contacts are in engagement or not. By this arrangement it is thus possible to obtain either of two directions of operation under the control of a two-wire circuit. It is important to note that the windings 50 and 51 can be designed to produce any desired low voltage so that the thermostat contacts will be subjected to a relatively low control voltage. With the usual thermostat and motor, it is necessary to employ a transformer to reduce the voltage for the control circuit to a value sufficiently low that no difficulty will be encountered with pitting of the thermostatic contacts. With the present arrangement of the contact, the motor and transformer are combined in a single unit.

Modification of Figure 2

In the arrangement of Figure 1, the greater reluctance of the flux path including pole portions 22 and 24 was obtained by making these pole portions of smaller cross sections than pole portions 25 and 23. It is also possible to obtain the same effect by making the pole pieces of uniform diameter by increasing the air gaps in one of the flux paths. Thus referring to Figure 2, the pole portions 122, 123, 124, and 125 all have the same cross sectional area. The pole portions 122 and 124 are, however, spaced somewhat farther from the armature 26 than are the pole portions 123 and 125. The result is that the reluctance of the flux path including pole portions 122 and 124 is higher than that including pole portions 123 and 125. The operation of the motor is otherwise the same.

While I have shown certain specific embodiments of my invention, it is to be understood that the invention is limited only by the scope of the appended claims.

I claim as my invention:

1. A motor for operation by periodically varying current comprising a rotatable armature, a core construction comprising two sets of polar extensions adjacent said armature providing two fixed reluctance flux paths through said armature, a first of said flux paths having a higher reluctance than the second, a pole shading winding on each of the polar extensions to shade the flux flowing through a portion thereof, the shading windings on one set of polar extensions being oppositely disposed to those on the other set, a constantly energized field winding on said core construction, and means including a winding associated with the low reluctance flux path for causing a portion of the flux normally flowing in the low reluctance flux path to flow through the high reluctance flux path.

2. A motor for operation by periodically varying current comprising a rotatable armature, a core construction comprising two sets of polar extensions adjacent said armature providing two flux paths through said armature, a first of said flux paths having a higher reluctance than the second, a pole shading winding on each of the polar extensions to shade the flux flowing through a portion thereof, the shading windings on one set of polar extensions being oppositely disposed to those on the other set, a constantly energized field winding on said core construction, a winding associated with the flux path of lower reluctance, and means to substantially short circuit said winding whereby a portion of the flux normally flowing in the low reluctance flux path is forced through the high reluctance flux path.

3. A motor for operation by periodically varying current comprising a rotatable armature, a core construction comprising two sets of polar extremities adjacent said armature providing two flux paths through said armature, the polar extensions of one of said sets being of smaller cross section than those of the other set so that the two flux paths have different values of reluctance, a pole shading winding on each of the polar extensions to shade the flux flowing through a portion thereof, the shading windings on one set of polar extensions being oppositely disposed to those on the other set, a constantly energized field winding on said core construction, and electrical means for causing a portion of the flux normally flowing in the low reluctance flux path to flow through the high reluctance flux path.

4. A motor for operation by periodically varying current comprising a rotatable armature, a core construction comprising two sets of polar extremities adjacent said armature providing two flux paths through said armature, the polar extensions of one of said sets beign more widely spaced from the armature than those of the other set so that the two flux paths have different values of reluctance, a pole shading winding on each of the polar extensions to shade the flux flowing through a portion thereof, the shading windings on one set of polar extensions being oppositely disposed to those on the other set, a constantly energized field winding on said core construction, and electrical means for causing a portion of the flux normally flowing in the low reluctance flux path to flow through the high reluctance flux path.

5. A motor for operation by periodically varying current comprising a rotatable armature, a core construction comprising two sets of polar extremities adjacent said armature providing two flux paths through said armature, a first of said flux paths having a higher reluctance than the second, a pole shading winding on each of the polar extensions to shade the flux flowing through a portion thereof, the shading windings on one set of polar extensions being oppositely disposed to those on the other set, a constantly energized field winding on said core construction, a relatively low voltage winding associated with the flux path of lower reluctance, and means including a low voltage control switch for substantially short-circuiting said winding whereby a portion of the flux normally flowing in the low reluctance path is forced through the high reluctance flux path.

6. A motor for operation by periodically varying current comprising a rotatable armature, field core means, a constantly energized winding associated with said core means, said core means comprising two sets of polar extensions adjacent said armature providing two fixed reluctance flux paths through said armature, a pole shading winding on each of the polar extensions to shade the flux flowing through a portion thereof, the shading windings on one set of extensions being oppositely disposed to those on the other set, a first of said flux paths having a higher reluctance than the second, whereby a greater proportion of the total flux flows in said second path than in the first and the disposition of the shading windings in said second path determines the normal direction of armature rotation, a winding associated with one of said flux paths, and means to vary the impedance in series with said winding to change the relative proportions of the total flux in said paths.

7. A motor for operation by periodically varying current comprising a rotor, a stator and constantly energized winding therefor, two pairs of oppositely shaded poles on said stator adjacent said rotor, a first pair of said poles having a greater portion of the total flux produced by said winding whereby direction of rotation of said rotor is determined by the shaded effect of said first pair of poles, selectively effective means associated with said first pair of poles whereby the entire flux therethrough is shaded and cooperates with the flux through said second pair of poles, said shaded flux aiding the shaded flux of said second pair of poles, to produce reverse rotation of said rotor.

8. A motor for operation by periodically verying current comprising a rotatable armature, a core construction comprising two sets of polar extremities adjacent said armature providing two flux paths through said armature, a first of said flux paths having a higher reluctance than the second, a pole shading winding on each of the polar extensions to shade the flux flowing through a portion thereof, the shading windings on one set of polar extensions being oppositely disposed to those on the other set, the disposition of the shading windings on said polar extensions comprising the lower reluctance path determining the normal direction of rotation of said armature, a constantly energized field winding on said core construction, and means for reversing rotation of the armature comprising a relatively low voltage winding associated with the flux path of lower reluctance, and means including a low voltage control switch for substantially short-circuiting said winding.

FREDERICK E. LANGE.